United States Patent [19]

Freeman et al.

[11] Patent Number: 4,550,436
[45] Date of Patent: Oct. 29, 1985

[54] PARALLEL TEXT MATCHING METHODS AND APPARATUS

[75] Inventors: Martin Freeman, Palo Alto, Calif.; Leon S. Levy, Morristown, N.J.

[73] Assignee: AT&T Bell Laboratories, Murray Hill, N.J.

[21] Appl. No.: 517,330

[22] Filed: Jul. 26, 1983

[51] Int. Cl.[4] .............................................. G06K 9/64
[52] U.S. Cl. .................................. 382/34; 340/146.2
[58] Field of Search ......................... 382/10, 34, 30; 340/146.2

[56] References Cited

U.S. PATENT DOCUMENTS

| | | | |
|---|---|---|---|
| 3,568,156 | 3/1971 | Thompson | 364/300 |
| 4,032,885 | 6/1977 | Roth | 382/34 |
| 4,119,946 | 10/1978 | Taylor | 382/34 |
| 4,205,302 | 5/1980 | Godo | 382/34 |
| 4,288,782 | 9/1981 | Bader et al. | 382/34 |
| 4,429,414 | 1/1984 | Asakawa | 382/34 |

OTHER PUBLICATIONS

"Recognize Regular Languages With Programmable Building-Blocks", *VLSI* 81, 1981, M. J. Foster and H. T. Kung, pp. 75–84.

"The Design of Special-Purpose VLSI Chips", *Computer*, vol. 13, No. 1, 1980, M. J. Foster and H. T. Kung, pp. 26–40.

"Hardware Algorithms for Nonnumeric Computation", *IEEE Transactions on Computers*, vol. C-28, No. 6, A. Mukhopadhyay, pp. 384–394.

*Primary Examiner*—Leo H. Boudreau
*Attorney, Agent, or Firm*—Robert O. Nimtz

[57] ABSTRACT

Pattern-matching circuitry is shown which permits the simultaneous or near simultaneous matching of entire lines of text to a regular expression test pattern. A synchronous or clocked embodiment is disclosed, as well as an asynchronous embodiment.

11 Claims, 8 Drawing Figures

PARALLEL TEXT MATCHING METHODS AND APPARATUS

BACKGROUND OF THE INVENTION

1. Field of the Invention

This invention relates to computer architectures and, more particularly, to specialized computer control units for efficiently handling regular expression text pattern-matching.

2. Description of the Prior Art

During the initial days of general purpose digital computers, applications involved almost entirely arithmetic and control types of computation. Since that time, there has been a steady shift from such primarily arithmetic applications to a heavy dependence on symbolic computation, typified by document preparation and text searching, often as part of so-called "office automation" systems. However, the basic architecture of computers has not been dramatically affected by this change in applications. Computers remain essentially serial machines with elaborate arithmetic capabilities and therefore do not provide efficient non-numeric computation.

One movement away from this historical approach is represented by applicants' copending application, Ser. No. 177,095, filed Aug. 11, 1980. This application discloses a highly parallel computer architecture particularly suited for processing raw text streams into formatted text lines for printed documents. Large-scale integration technology has made such complex circuitry economical for heavily used applications, such as document preparation.

Another fundamental process used in office automation systems is searching through lines of text for given words, phrases, or sentences. This pattern-matching is particularly vital to locating pertinent information in large masses of textual data available in machine-readable form, i.e., in large data bases. Indeed, the well being of the information age is heavily dependent on fast and efficient methods of locating pertinent information in large collections of such information. Again, however, the traditional design of general purpose digital computers, as essentially arithmetic, serial machines, has not lent itself to fast and efficient pattern-searching. Indeed, because of the large volume of data which must be processed in a serial manner, many data retrieval problems become uneconomical; extensive indexing schemes are resorted to in order to limit the field of search.

SUMMARY OF THE INVENTION

In accordance with the illustrative embodiment of the present invention, this problem is solved by providing a computer architecture which is particularly suitable for fast and efficient searching through large volumes of textual material for particular patterns of words, phrases, and sentences. More specifically, a highly parallel matching circuit is provided, which can be programmed by a target pattern to look at entire lines of text simultaneously and in parallel for character matches. Successive characters of the target pattern are then matched, one at a time, with the entire line of text. Matching circuitry indicates immediately if a match is found or, after processing the entire target pattern, that no match has been found. Successive lines of text can be subjected to this same parallel matching process at a rapid pace to complete the search process.

One major advantage of the present invention is the avoidance of character-by-character serial matching predominant in the prior art. Furthermore, the success or failure of a character match can be instantaneously used to control the decision on whether or not an entire pattern has been matched, thus reducing the storage requirements of the system.

The present invention readily lends itself to so-called "regular expression" text matching, since each character of the target pattern can take on alternate or canonical values, or values within a range of values. A "regular expression" is a generalized target pattern including special characters which serve as operators to express the alternatives which will satisfy a match. The ability to search for regular expressions, rather than simply literal expressions, vastly expands the power and efficiency of a search. A regular expression search algorithm using the serial approach of prior art computers is disclosed in K. L. Thompson U.S. Pat. No. 3,568,156, granted Mar. 2, 1971.

DETAILED DESCRIPTION

Figure 1:
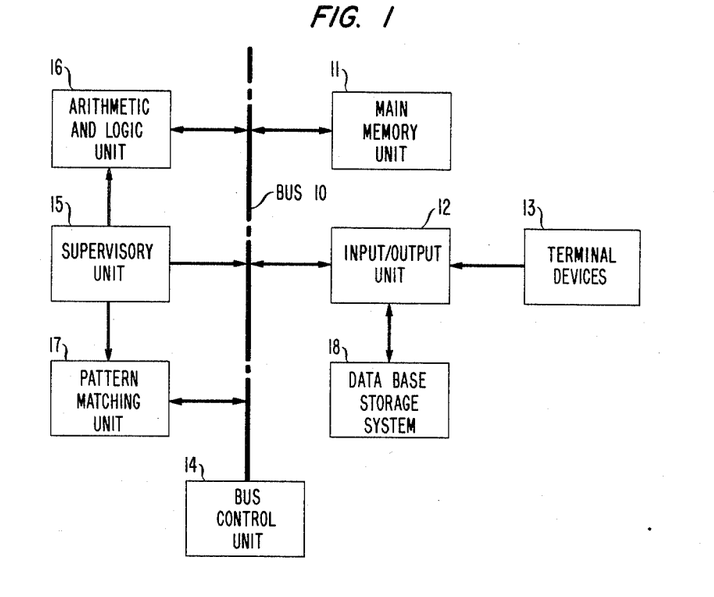
FIG. 1 is a general block diagram of a computer architecture utilizing a pattern-matching unit in accordance with the present invention.

In FIG. 1, there is shown a general block diagram of a computer architecture suitable for implementing the principles of the present invention. The computer of FIG. 1 comprises a common bus 10 to which all of the other units of the computer are connected. A main memory unit 11, for example, can be used to store program instructions and data for use by the other elements of the computer. An input-output unit 12 communicates with bus 10 and serves to introduce programs and data into memory 11 from terminal devices 13, or from data base storage system 18. Unit 12 also is suited for deriving data from the internal memory 11 or other units of the computer and supplying this data to terminal devices 13 or data base system 18. The bus 10 is a multiple access digital interconnecting medium which is controlled by bus control unit 14. Under the control of unit 14, the various components of the computer of FIG. 1 are enabled to communicate with each other by selectively gating output data from one device onto bus 10 and simultaneously gating that data off of bus 10 to one of the other components. In this way, bus 10 is a shared communication path between all of the components of the computer of FIG. 1.

Also connected to bus 10 is a supervisor unit 15, which obtains instructions or commands either from the main memory unit 11 or from input-output unit 12. Indeed, supervisory unit 15 is designed to receive a plurality of commands from these various sources and to execute these commands in a timed sharing mode. Some of these commands to supervisor unit 15 represent requests for the computer to perform numerical or arithmetic types of computations. These requests are queued up in supervisor unit 15 and passed, one at a time, to arithmetic and logic unit 16, which performs the actual execution of the computational request.

Up to this point, the description of FIG. 1 has encompassed units which are standard in present computer architectures and form no part of the present invention. These units will, therefore, not be described in any further detail here.

In accordance with the present invention, the computer in FIG. 1 also includes a pattern-matching unit 17 which communicates with bus 10 in the same manner as the other units of the computer of FIG. 1. When supervisor unit 15 receives pattern-matching requests or commands, either from memory 11 or from input-output unit 12 these commands are queued up in supervisory unit 15 and passed on to pattern-matching unit 17. Thus, pattern-matching unit 17 performs an analogous function for pattern-matching applications that arithmetic and logic unit 16 performs for arithmetic or numerical computation requests.

Before embarking on a detailed description of the preferred embodiments of the present invention, it will be helpful to discuss the pattern-matching function in general.

The pattern-matching problem arises in most modern digital computer environments where it is desired to find occurrences of specific words, phrases, or other sequences of symbols in large data files of text or similar character strings. A typical command to achieve this function can be called a "grep", for generalized regular expression pattern, command. A "regular expression", in this context, is a generalized technique for representing the particular pattern for which the search is being conducted. Thus, a typical pattern-searching command might be as follows:

grep(pattern, filename)

The mnemonic "grep" is the command, implemented typically in the prior art as a subroutine. The parameter "pattern" is a regular expression representing the pattern to be searched for. The parameter "filename" is the identification of the file records which are to be searched looking for the pattern of the regular expression. Typically, the "grep" command looks at the file, one field or one line at a time, and copies to an output medium only those fields or lines which include matches to the pattern. Thus "grep" is an operator which selects all lines or fields in a set of lines or fields that match the regular expression given in "pattern".

A brief discussion of regular expressions is in order. If A is an alphabet of all of the possible symbols in the file called "filename", then a can be defined as any single symbol from alphabet A; and s can be defined as any string of the symbols a from the alphabet A. Certain symbols are utilized as regular expression operators and, hence, are not a part of the alphabet A. For convenience, the following regular expression operators can be defined:

1. "∧" (caret is a reserved symbol which stands for the start of any line or field in the file, and serves to anchor a pattern at the beginning of a line or field.

2. "$" (dollar sign) is a reserved symbol which stands for the end of any line or field in the file, and serves to anchor a pattern at the end of a line or field.

3. "*" (asterisk) is a reserved symbol which stands for any string of symbols from the alphabet A, including zero symbols, but excluding the reserved symbols. That is, "*" is a "wild card" symbol.

Thus, if s is a searchable pattern, then "∧s", "s$", "*s", and "s*" are searchable patterns.

One useful alphabet is the set of letters, numerals, and punctuation symbols used for written language. The alphabet can also include the set of mathematical operator symbols and any other symbols utilized in the files to be searched.

With these definitions, it is possible to define a regular expression R as an expression denoting a subset of the set of finite length strings of symbols over the alphabet A. R itself is composed from the symbols of A, the operators "∧", "$", and "*", and the punctuation symbols "(", i.e., left parentheses, and ")", i.e., right parentheses. The rules for specifying R are:

1. $\phi$, the empty set of strings, is a regular expression.
2. ∧, the start-of-line operator, is a regular expression.
3. Any $a_i$ in A is a regular expression.
4. If $s_1$ and $s_2$ are regular expressions, then
   a. ($s_1$ V $s_2$) is a regular expression;
   b. $s_1 s_2$ is a regular expression; and
   c. $(s_1)$* is a regular expression.
5. Nothing else is a regular expression.

Stated broadly, the method of pattern-matching subsumed by the present invention includes the following general steps:

1. Use the regular expression pattern to initialize a pattern-matching unit;

2. Process entire lines or fields of a storage file simultaneously and in parallel by the initialized pattern-matching unit; and 3. Identify those lines or fields in the storage file which include a pattern which matches the regular expression pattern.

Figure 2:
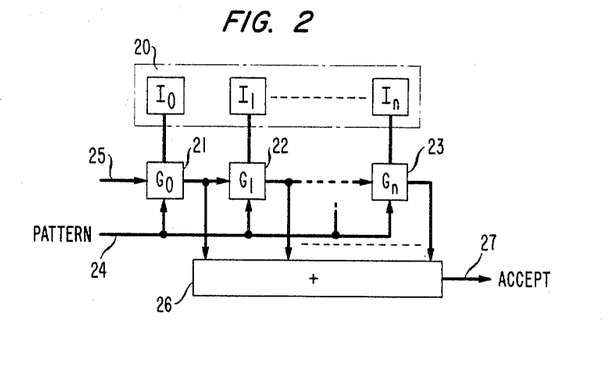
FIG. 2 is a general block diagram of the pattern-matching unit of the computer of FIG. 1.

A general block diagram of a pattern-matching unit, suitable for use in the computer of FIG. 1, and embodying those pattern-matching steps, is shown in FIG. 2.

In FIG. 2, an input line register 20 comprises a simple storage register having a plurality of storage cells, one for each of the symbols of the input line or field $I_0, I_1, \ldots I_n$. Coded digital representation of the symbols are stored as binary codes in the storage cells of register 20. Each of the coded symbols stored in register 20 is applied to one of an equal plurality of grep processor cells 21, 22, . . . 23, to which there is also applied the pattern to be searched for, on line 24. The output of each of cells 21 through 23 is used to precondition the input to the next cell, providing a match has occurred. The input 25 to cell 21 is used to anchor the pattern to the beginning of a line or field.

The outputs of all of cells 21 through 23 are combined in OR gate 26 which produces an output on lead 27 when any of the inputs to gate 26 indicate a match. The output on lead 27 can therefore be used to accept that input line as including a matching pattern. If there is no output on lead 27 at the end of the pattern comparison, the input line in register 20 does not include a matching pattern and a new input line is stored in register 20.

Figure 3:
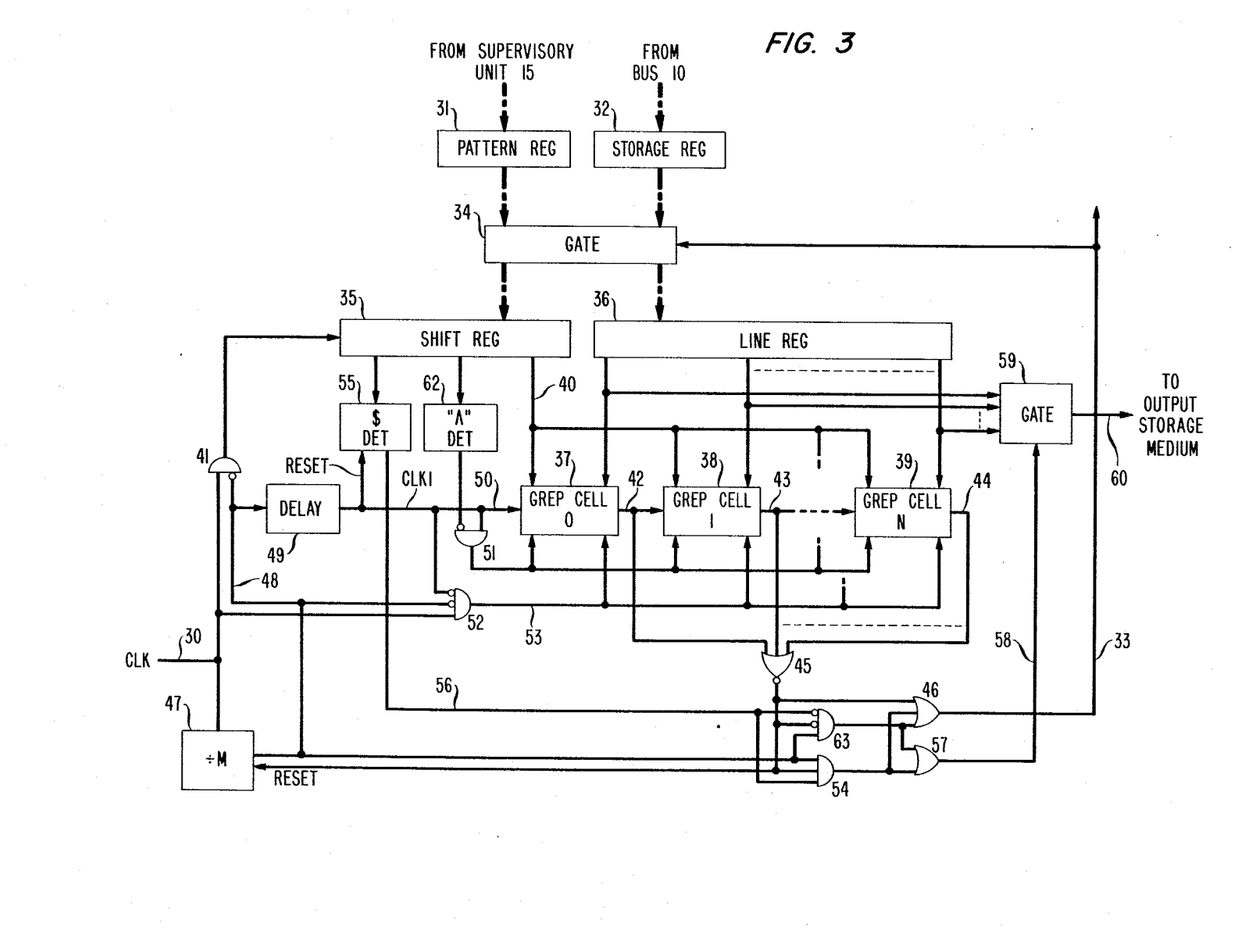
FIG. 3 is a detailed block diagram of one embodiment of the pattern-matching unit of FIG. 2.

In FIG. 3, there is shown a detailed block diagram of one embodiment of the pattern-matching unit of FIG. 2. The embodiment of FIG. 3 is synchronous in that all the operations of FIG. 3 are controlled by clock pulses on lead 30. The pattern to be matched is obtained from supervisory unit 15 of FIG. 1 and placed in pattern register 31. The lines of text, against which a match is to take place, are received from bus 10 of FIG. 1, and placed in storage register 32. At an appropriate time, under the control of the signal on lead 33, gate 34 is operated to transfer the pattern in register 31 to a shift register 35 and, simultaneously, to transfer the line of text from storage register 32 to line register 36. The same pattern, of course, is reloaded into shift register 35, since the previous version of the pattern is partially or wholly shifted out.

Line register 36, like register 20 of FIG. 2, has a storage position for each of the symbols or characters of the line of text. One of these symbols is applied to each of grep cells 37, 38, . . . 39. If the line of text includes N characters or symbols, then N grep cells 37 through 39 are provided, one for each of these symbols.

The pattern symbols in shift register 35 are shifted out of register 35, one at a time, onto bus 40 under the control of clock pulses from clock pulse line 30 through inhibited AND gate 41. The input symbols from register 36 are compared with the symbols of the pattern, one at a time, from shift register 35 in grep cells 37 through 39. If a match occurs in any of the grep cells 37 through 39, an output signal from the corresponding grep cell appears on one of leads 42, 43, . . . 44, respectively. These output signals are applied simultaneously to the next one of the grep cells 37 through 39, and also to NOR gate 45. The grep cells 37 through 39 operate in such a manner that an output is produced only if a match occurs and, at the same time, a match from the previous cell had occurred in the previous time slot. NOR gate 45 produces an output if, and only if, all of its inputs are zeroes, thus indicating that no match has occurred in any one of the grep cells 37 through 39. This condition indicates a failure of the pattern-matching operation and may occur at any time during the matching cycle. The output of NOR gate 45 is applied through OR gate 46 to operate gate 34 via lead 33, and to request a new line to be inputted to storage register 32. At the same time, the output of NOR gate 45 resets a divide-by-M circuit 47 and, via the operation of gate 34, rewrites the pattern from register 31 over the partially shifted pattern in shift register 35 in preparation for the beginning of a new cycle with a new line.

The clock pulses on lead 30 are applied to divide-by-M circuit 47 to provide an output signal on lead 48 once for every M clock pulses on lead 30, where M is the number of symbols in the pattern in shift register 35. The clock pulses on lead 48 have therefore been called the "CLKM" pulses. The CLKM pulses on lead 48 are applied through a delay circuit 49 which delays the CLKM pulse for one clock pulse period, thus providing on lead 50 a CLK1 clock pulse. This CLK1 clock pulse on lead 50 is applied as the initiating input to grep cell 37. It is also applied to an inhibited AND gate 51, the inhibiting input of which is taken from a "caret" detector 52. Detector 52, of course, is connected to the first stage of shift register 35 and detects the presence of a caret in the first storage position of shift register 35. A caret in this position indicates that the pattern to be matched is anchored at the beginning of the line. The output of inhibited AND gate 51 is applied to grep cells 38 through 39 as an initializing input.

It can thus be seen that all of the cells receive an initializing "1" condition if the pattern to be matched is not anchored at the beginning of the line. If the pattern to be matched is anchored at the beginning of the line, only the first grep cell 37 receives a "1" initializing condition. This arrangement ensures that the pattern will match only if it is properly anchored at the beginning of the line.

Clocking pulses for making the comparisons in grep cells 37 through 39 for all but the first and last clock pulse periods of each cycle are obtained through inhibited AND gate 52 and bus 53. Clock pulses from lead 30 are applied to AND gate 52. Inhibiting inputs of AND gate 52 are taken from the output of divide-by-M circuit 47 and from the output of delay circuit 49. Thus, clock pulses appear on bus 53 during all clock pulse periods, except the first and the last, of each comparison cycle.

If no failure of match condition is indicated by NOR gate 45 during a comparison cycle, then, at the end of the comparison cycle, as determined by the CLKN clock pulse on lead 48, inhibited AND gate 63 and AND gate 54 are enabled by the CLKN pulse on lead 48. One inhibiting input to AND gate 63 is derived from a "$" detector 55, which is connected to the last symbol of the pattern stored in shift register 35. If this symbol is a dollar sign, indicating that the pattern is to be anchored at the end of the line, then detector 55 detects this dollar sign, and generates an output on output lead 56. This output on lead 56 is latched for the period of the cycle so as to be available when the entire line has been compared. Dollar sign detector 55 is reset by the CLK1 pulse on lead 50 at the beginning of the next comparison cycle.

The output of inhibited AND gate 63 is applied to OR gate 46 to produce a signal on lead 33 to operate gate 34 and request a new line to be inputted to storage register 32. Inhibited AND gate 63 is enabled at the end of the pattern-matching cycle (indicated by lead 48) if a match has not been detected by NOR gate 45, and if the pattern is not anchored at the end of the line, as indicated by the absence of a signal on lead 56.

On the other hand, at the end of the matching cycle, AND gate 54 is also partially enabled. If the pattern is matched at the end of the cycle, and is properly anchored and the end of the line, the output of AND gate 54 is applied to OR gate 57 to produce a signal on lead 58, which operates a gate 59. Gate 59, when operated, transfers the contents of line register 36 to a cable 60 to an output storage medium in one of the units of FIG. 1. This signal on lead 58 indicates that the match has occurred, and that the line stored in register 36 is to be saved as the output of the pattern-matching operation.

It can be seen that the system of FIG. 3 operates to compare input lines to a pattern in a parallel, simultaneous fashion, one symbol of the pattern at a time being compared to all of the symbols of the line. If, at any time during a matching cycle, none of the symbols match the current symbol of the pattern, then the comparison cycle is immediately terminated by the output of NOR gate 45, resetting the circuits that are necessary, and requesting a new line to be inputted. In this way, the pattern search is speeded up significantly, since pattern-matching can be terminated before the end of an entire matching cycle. Since it is presumed that most lines to be examined will not include a pattern to be matched, this feature of the present invention provides significant time-saving advantages.

It will also be noted that the circuit of FIG. 3 can be used with regular expression operators, including the caret and dollar sign, to provide appropriate anchoring at the beginning or the end of the line being examined. In this connection, and as will be discussed in greater detail in connection with FIG. 4, grep cells 37 through 39 also include the means to cope with asterisks in the pattern to be matched. Thus, the system of FIG. 3 operates on regular expressions and has all of the added power of pattern generality afforded by the regular expression pattern operators described above.

Figure 4:
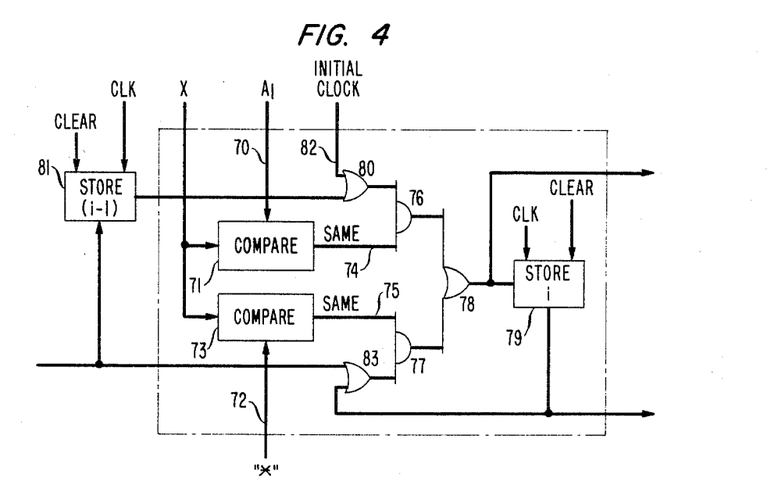
FIG. 4 is a detailed circuit diagram of one cell of the pattern-matching unit of FIG. 3.

In FIG. 4, there is shown one embodiment of the grep cells 37 through 39 of FIG. 3. The cells 37 through 39 are equal in number to the number of symbols or characters in line register 36, and are all identical. The cell of FIG. 4 implements the following equation:

$$S(i,n+1) = S(i-1,n)(x=A(i)) + (x=*)[-S(i-1,n+1)+S(i,n)] \quad (1)$$

where $S(i,n+1)$ is the output of the ith grep cell at the nth iteration of the symbol matching process, $A(i)$ is the ith input symbol to the ith grep cell, x is the current symbol from the pattern to be matched, and "*" is the wild card character, i.e., the character that matches any string of characters, including zero.

Equation (1) states that the carry-over from any grep cell is a "1" if the current symbol matches the pattern symbol, and the previous grep cell produced a match, or if the current pattern symbol is an asterisk, and either the previous symbol currently produces a match, or the current signal previously produced a match. In all other cases, the output of the grep cell is a "0". In FIG. 4, this is accomplished by comparing the current pattern symbol "x", on leads 40, to the input symbol $A(i)$, on leads 70, in carry-over circuit 71. At the same time, the signals on leads 40 are compared to the asterisk signals on leads 72 in compare circuit 73. Compare circuits 71 and 73 are bit-by-bit comparison circuits which produce outputs on leads 74 and 75, respectively, if, and only if, all of the bits of each input are identical in each bit position.

The output of compare circuit 71 on lead 74 is applied to AND gate 76 while the output of compare circuit 73 on lead 75 is applied to AND gate 77. The outputs of AND gates 76 and 77 are combined in OR gate 78 and applied as an input to storage cell 79. Storage cell 79, under the control of clock pulses from bus 53 (FIG. 3), stores the output of the matching process until the next comparison cycle, thereby making it available for the next grep cell during the next clock cycle.

The remaining input to AND gate 76 is derived from OR gate 80, one input of which is taken from the storage cell 81 from the previous grep cell. The other input to OR gate 80 is taken from initializing bus 82, derived from lead 50 (FIG. 3), for the first grep cell 37, and from the output of gate 51 (FIG. 3) for the remaining grep cells 38 through 39. The remaining input to AND gate 77 is taken from OR gate 83, one input of which is taken from the output of storage cell 79, and the other input of which is taken from the input to storage cell 81. AND gate 76 implements the first term of equation (1), while AND gate 77 implements the second term.

It can be seen that FIGS. 3 and 4 comprise digital logic and storage circuitry exclusively and, hence, can be readily fabricated in integrated circuit form. The pattern-matching unit of FIG. 3 can therefore be realized in very small and very inexpensive circuitry, thereby making the pattern-matching unit of the present invention extremely feasible for mass production and distribution.

Figure 5:
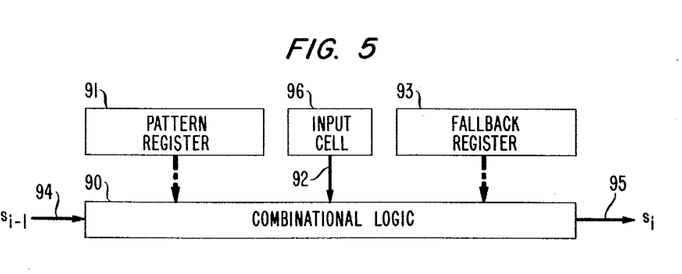
FIG. 5 is a general block diagram of another embodiment of the pattern-matching cell of FIG. 2.

In FIG. 5, there is shown yet another embodiment of the parallel pattern-matching unit of FIG. 2. FIG. 5 represents one cell of cells 21 through 23, and provides considerably faster response time than the embodiment of FIG. 3. Moreover, the embodiment of FIG. 5 is asynchronous in that the entire pattern is applied to the grep cells and, after the logic settles down, the match/no match output becomes immediately available. The embodiment of FIG. 5 is a variant of a finite state machine and may be better understood after considering FIG. 6.

Figure 6:
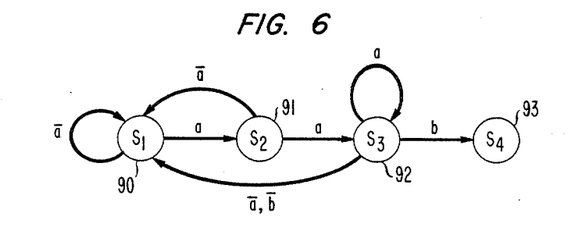
FIG. 6 is a state diagram of a sequential process useful in explaining the operation of FIG. 5.

In FIG. 6, there is shown a state diagram for matching the pattern "aab". The circles 90, 91, 92, and 93 represent states of the matching circuitry. It is assumed that the circuit initially starts in $S_1$ state 90 and, if a pattern match is completed, ends in $S_4$ state 93. The arrows represent transitions between the states. The labels on the arrows represent the characters or symbols which are required in the input text line to cause the corresponding transitions between states. It can be seen by inspection that the state diagram of FIG. 6 represents the matching of the pattern "aab".

It will be first noted that there is one more state in the state diagram than there are symbols in the pattern to be matched. The major transitions between the states (the horizontal arrows in FIG. 6) represent the occurrences of the pattern characters in the order in which they appear in the pattern to be matched. All other transitions in FIG. 6 are failure transitions, i.e., transitions which occur if the next symbol in the pattern is not matched. Finally, it should be noted that some failure transitions leave the finite state machine of FIG. 6 in the same state as it found it. Since these transitions cause no change in the state of the machine, they can be ignored.

All of the remaining failure transitions of FIG. 6 involve returning to a previous state. These state-changing failure transitions can therefore be termed fallback terminations. The embodiment of FIG. 5 is based on the identification of one fallback transition for each state (except the last) of the state diagram. In operation, an input character is applied to the ith state; and a transition taken to the (i+1)st state if a match occurs. If no match occurs, a transition is taken to a previously identified fallback state. The grep cell of FIG. 5 implements this approach.

In FIG. 5, a combinational logic circuit 90 is provided, which performs all of the comparison logic required. A pattern register 91 contains all of the symbols of the pattern to be matched. The input symbol for this stage is applied from input cell 96 on leads 92. A fallback register 93 contains an identification of the fallback state for each symbol in pattern register 91. This fallback state is the state to which a transfer is to be taken if no match occurs. If a match does occur, the input state on leads 94 is incremented by one and applied to the output state leads 95. When the output state from any cell reaches the final state of the pattern-matching state diagram (state 93 in FIG. 6), the process terminates, as indicated in FIG. 2, and a match is indicated. If the entire pattern in register 91 is compared, and no match occurs, the process terminates; and a failure to match is indicated.

The fallback states stored in fallback register 93 constitute a failure function which can be calculated, as shown on pages 329–335 of "The Design and Analysis of Computer Algorithms" by A. V. Aho, J. E. Hopcroft, and J. D. Ullman, Addison-Wesley Publishing Company, Reading, Mass. 1974. This failure function is calculated from the pattern in register 91 prior to the search activity.

Figure 7:
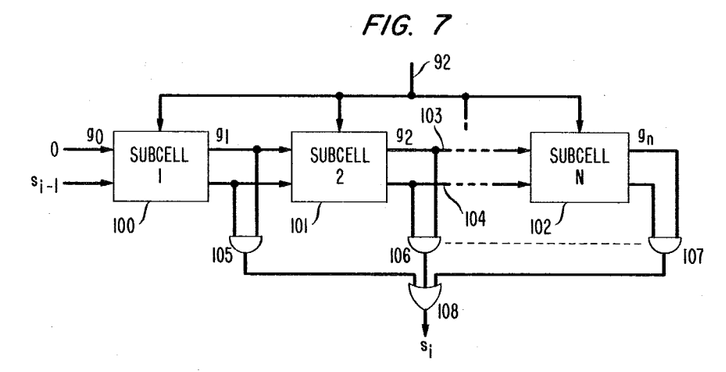
FIG. 7 is a more detailed block diagram of the combinational logic circuit of the pattern-matching cell of FIG. 4.

In FIG. 7, there is shown a more detailed block diagram of the combinational logic circuit 90 of FIG. 5.

The circuit of FIG. 7 comprises a plurality of subcells 100, 101, . . . 102, which calculate the next state of that stage of the pattern recognizer by iteratively computing transitional states, determined by the failure function in register 93, until the actual state is ultimately determined. At the most, $n = \log_2 N$ subcells 100 through 102 are required, where N is the length of the regular expression pattern string. The upper lead 103, threading through all of the subcells 100 through 102, is a gating function, initially zero ($g_o = 0$), but which eventually becomes a one ($g_i = 1$) at the output of one of cells 100 through 102. Indeed, the gating function on lead 103 becomes "1" precisely when the state identification signal on a lower bus 104 reaches the appropriate final state for that stage. At that time, the gating function on lead 103 enables one of AND gates 105, 106, . . . 107 to connect the state identification signals on bus 104 from one of subcells 100 through 102 to OR gate 108. The output of OR gate 108 constitutes the correct state identification output of the stage illustrated in FIG. 7.

The state identification outputs from the cells of FIG. 7 correspond to the state numbers illustrated, for example, in FIG. 6. Thus, a match occurs for the entire pattern when the state identification matches the final state (93 in FIG. 6) of the matching state diagram. This state identification can, therefore, be detected to signal a match, and to begin a search of a new input line. If no match occurs, a failure to match is signaled, and a search of a new input line is initiated.

Figure 8:
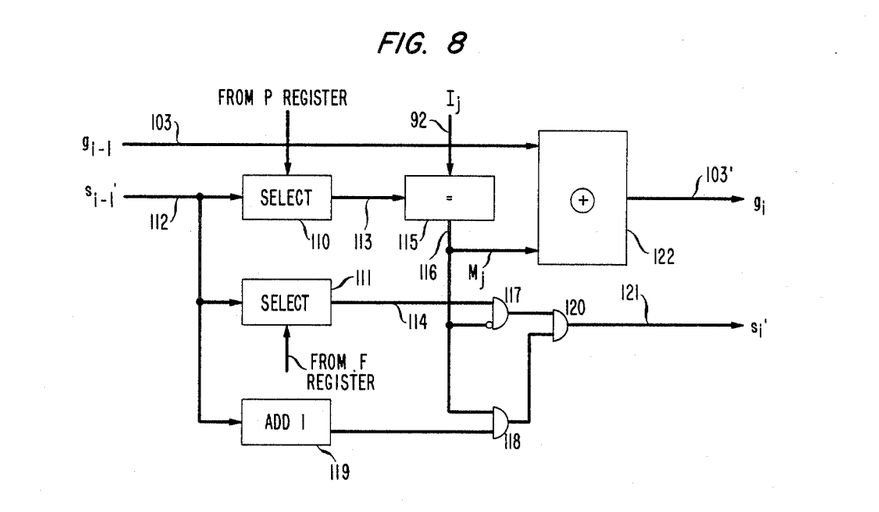
FIG. 8 is a detailed circuit diagram of one of the pattern-matching cells of FIG. 6.

Each of the subcells of FIG. 7 can be implemented as shown in FIG. 8. FIG. 8 is thus a detailed circuit diagram of a subcell corresponding to any one of subcells 100 through 102 in FIG. 7. The subcell of FIG. 8 comprises a pair of selectors 110 and 111 which, in response to control signals on lead 112, connect one stage of pattern register 91 (selector 110) and one stage of fallback register 93 (selector 111) to output buses 113 and 114, respectively. The control input leads 112, of course, carry an identification of the state in which the pattern matching circuit is at that particular point in time. As can be seen from FIG. 6, the value of the state is also an identification of the number of the symbol of the pattern which is to be matched next. Selectors 110 and 111 merely make the appropriate pattern symbol available in leads 113 and, simultaneously, the appropriate fallback state on leads 114.

The pattern symbol on lead 113 is compared with the input symbol on leads 92 in comparator 115. Comparator 115 produces an output on lead 116 if, and only if, the pattern symbol on leads 113 matches the input symbol on leads 92. The output of comparator 115 is used to enable one of AND gates 117 or 118. The other input to inhibited AND gate 117 is the fallback state on lead 114. The other input to AND gate 118 is the input state signal on leads 112, augmented by one in incrementing circuit 119. The outputs of AND gates 117 and 118 are combined in OR gate 120 to form the output state $S_i$ on leads 121.

It can be seen that a pattern match, indicated by a signal on lead 116, will increment the state by one, while a pattern failure to match will substitute the fallback state for the current state on leads 112. The signal on lead 116 is also applied to exclusive OR gate 122, to which the gating function on lead 103 is also applied. The first match of the input symbol to a pattern symbol will thus enable the gating function in output lead 103. As noted in connection with FIG. 7, this gating function is then used to gate the output state on leads 121 to a stage output gate 108 (FIG. 7).

The embodiment of FIGS. 5, 7, and 8 has some advantages over that of FIGS. 3 and 4. However, both embodiments of the present invention provide significant improvements over the sequential procedures available in the prior art.

What is claimed is:

1. Apparatus for matching signals representing a line of printed alphanumeric characters with a given pattern of test signals representing a canonical string of printed characters comprising
   means for storing said line of character representing signals,
   means for storing said pattern of test signals,
   a plurality of alphanumeric character recognition cells equal in number to the number of said characters in said line,
   means for applying each one of said character signals from said line to a respective one of said cells,
   means for sequentially applying each of said pattern test signals to all of said cells, and
   means for detecting the sequential matching to said pattern test signals in successive ones of said cells.

2. Apparatus according to claim 1 wherein each of said cells comprises
   means for sequentially comparing each of said character representing signals to all of said pattern test signals, and
   means responsive to a match of said entire pattern for enabling said line signal storage means.

3. Apparatus according to claim 1 wherein each of said cells comprises
   plurality of subcells,
   means for generating identifying signals for numerically identifying the successive states of the process of matching said character representing signals to said pattern test signals,
   means for incrementing said identifying signals for each match in said process,
   means for substituting fallback identifying signals for said state identifying signals for each failure to match in said process, and
   means for indicating the attainment of a predetermined final state identification signal.

4. Apparatus according to claim 1 wherein said pattern test signals comprise a representation of a regular expression including alphabet signals and operator signals.

5. Apparatus according to claim 2 further comprising
   shift register means for storing said pattern test signals, and
   means for sequentially shifting each of said pattern test signals out of said shift register means and into all of said cells.

6. Apparatus according to claim 4 wherein said operator signals include a start-of-line anchoring signal.

7. Apparatus according to claim 4 wherein said operator signals include an end-of-line anchoring signal.

8. Apparatus according to claim 4 wherein said operator signals include a "wild card" signal which stands for any sequence of any number of other symbols.

9. The method matching an entire line of input alphanumeric text signals with a given pattern of alphanumeric test signals comprising the steps of
   (1) storing said given pattern of test signals,
   (2) comparing each of said test signals simultaneously with all of said input text signals, (3) generating a pattern-matching signal in response to a sequence of test signal matches in successive input text signal comparisons, and (4) initiating a new line-matching cycle by obtaining another line of input text signals in response to said pattern-matching signal.

10. The method according to claim 9 further comprising the steps of (a) storing a given pattern of fallback state identification signals, (b) incrementing a matching state identification signal each time one of said test signals matches one of said text signals, and (c) substituting a corresponding fallback state identification signal for said matching state identification signal each time one of said test signals fails to match one of said text signals.

11. The method according to claim 9 further comprising the step of generating a pattern of test signals comprising a regular expression including alphabet signals and operator signals.

* * * * *